United States Patent Office 3,613,272
Patented Oct. 19, 1971

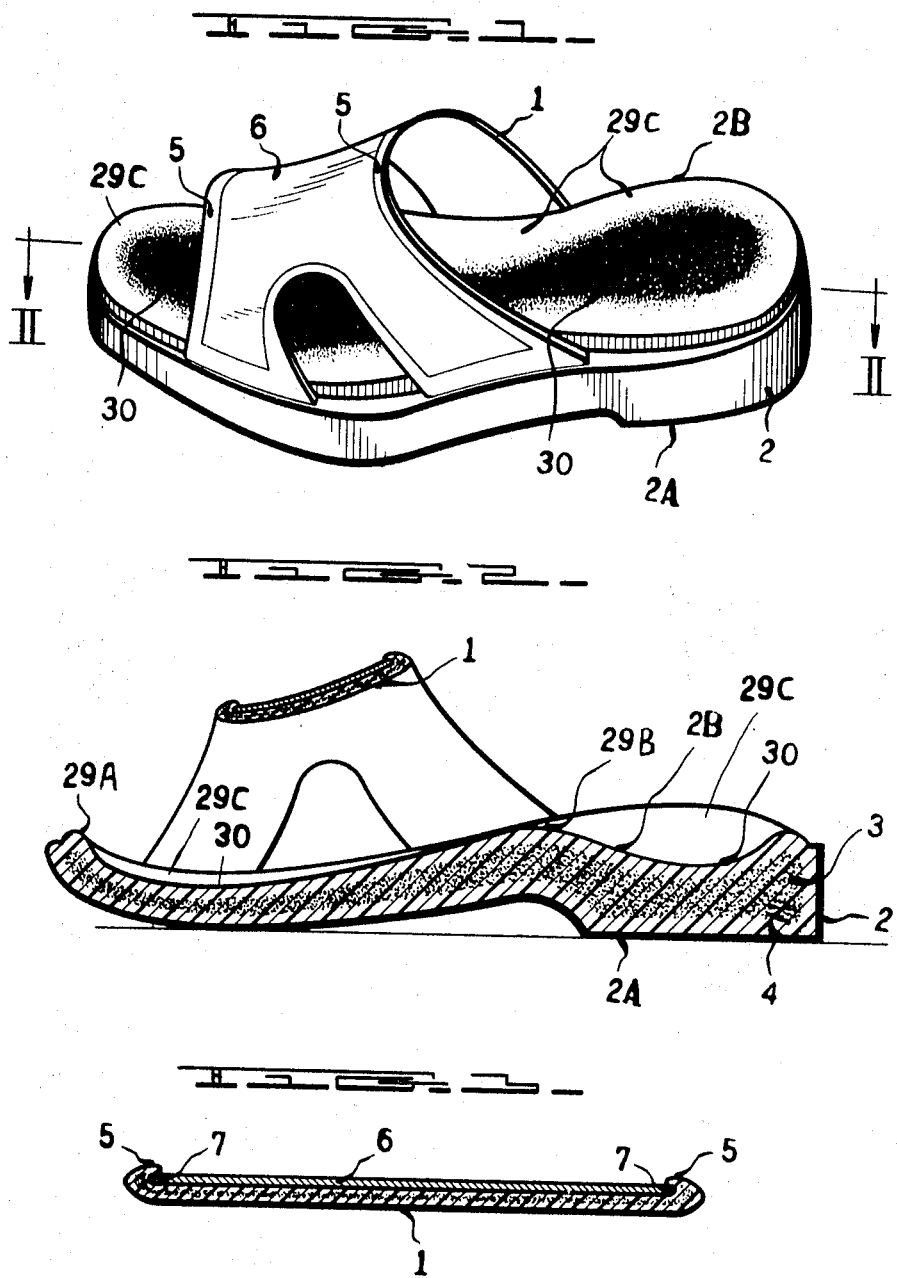

3,613,272
FOOTWEAR
Tatsuo Fukuoka, 3,3-Ban, 2-chome, Shin-Minami-
Fukushima, Tokushima, Japan
Original application Oct. 24, 1968, Ser. No. 770,324, now
Patent No. 3,552,039, dated Jan. 5, 1971. Divided
and this application Aug. 31, 1970, Ser. No. 68,145
Int. Cl. A43b
U.S. Cl. 36—2.5 R
4 Claims

ABSTRACT OF THE DISCLOSURE

Improved footwear is provided which includes an integrally formed sole and a foot cover member, each of the sole and foot cover member being integrally molded from synthetic thermoplastic resin material and having a foamed interior portion and a non-foamed exterior portion integral with and surrounding the foamed portion.

RELATED APPLICATION

This application is a division of my prior co-pleading application entitled. "Improvement of Footwear," Ser. No. 770,324, filed Oct. 24, 1968, now Pat. No. 3,552,039.

BACKGROUND AND SUMMARY

The present invention relates to an improvement of footwear, more particularly to a low cost but comfortable shoe or boot formed of synthetic resin material.

A main object of the present invention is to provide a novel shoe or boot of which a main body and a foot cover member are integrally and simultaneously molded of thermoplastic synthetic resin material, having a foamy interior portion adapted for providing resiliency and comfort and having a non-foamy outer layer integral therewith adapted for providing durability and resistance against deformation of the shoe.

Further main object of the present invention is to provide a new footwear, a band or foot cover main member of which has at least one band cover member on the surfaces thereof, said band cover member being formed of suitable material such as synthetic resin sheet (leather), woven, non-woven or knit cloth, natural or synthetic leather, fur, haired sheet (leather), woolven sheet (leather) or the like and having suitable varied designs and/or colorful designs on upper surface thereof, whereby simple and monotonous figure of the sandal of which sandal main body and band main member are integrally and simultaneously molded is much improved so as to be full of variety with varied designs and/or colorful designs. Further, in the event that the band cover member made of fur or the like material is applied to the surface of the band main member the sandal can be obtained as that for the cooling winter.

A further object of the present invention is to provide a new footwear of which the sole is equipped with a unique upper surface so as to further provide enhanced comfort to wear.

A further object of the present invention is to provide a mold available for easily and effectively producing said footwear.

A further object of the present invention is to provide a new footwear which is capable of easily and economically producing.

Still further objects and advantages of the present invention will appear from the following disclosure of a preferred form of embodiment thereof taken in connection with the attached drawings, in which:

FIG. 1 is a perspective view of a sandal according to the present invention;

FIG. 2 is a longitudinal sectional view of the sandal taken along the line II—II in FIG. 1;

FIG. 3 is an enlarged cross-sectional view of band of the sandal according to the present invention;

Figure 4:
FIG. 4 is an enlarged cross-sectional view showing other embodiment of the band in which a band cover member is mounted on the back surface of the band main member.

Referring to the drawings 1 to 3, illustrated therein is a new improved sandal according to the present invention. Said sandal is molded of thermoplastic synthetic resin material and the construction thereof will be hereinafter represented in detail.

The sandal consists of a band main member 1 and a sandal main body 2 with a heel 2A which are simultaneously and integrally molded in one step by means of the specific process to be later illustrated.

As will be hereinafter described in greater detail, and as best appears in FIGS. 1 to 3, the sandal including the band main member 1 and the andal main body 2 is molded as an integral unit of a uniquely-formed synthetic resin material wherein the interior composition includes a multitude of hollow, bubble-like resilient foam elements as designated by the numeral 3, and wherein the outer, surrounding portion or layer 4 is substantially devoid of said foam elements.

As a consequence of said novel structural composition, the foamy interior portion of the resinous material provides a highly resilient and pliable cushion for providing the comfort in use, while the relatively firm non-foamy surrounding layer minimizes deformation of the sandal caused by the weight of a user thereof.

In addition, said non-foamy outer layer may be provided with a water insulation for avoiding the saturation of water and strongly connected between the band main member and the sandal main body, and as a result of the existence of the bubble-like foam elements, the foam elements include air therein so that the weight of the sandal can be reduced.

In accordance with the present invention, the upper surface 2B of the sandal main body 2 is formed in a curved shape in conformity with the form of the user's sole so as to provide the user with the comfort to wear.

When a sandal having the above-described construction is worn by the user, his sole can be brought into perfect snag-fit contact with elevated portions 29a and 29b and generally concave recessed portions 30 of the upper surface of the sandal main body and accordingly the sandal is subjected to a well-balanced natural load with the result that uneven wear of the sole can be eliminated, the foot of the user being ensured against the removal from the band of the sandal due to the unbalanced loading. The central raised portion 29b is adopted to support the arch of the foot, and raised ridge portions 29c extend around the periphery of the recesses 30.

As an outstanding advantage of the invention, the wearer can walk naturally without slippage and fatigue with extremely improved wearing comfort.

In addition, further the sandal of the invention, as obviously shown in FIG. 3, provides expanded portions 5 on both edges of upper surface of the band main member 1, said expanded portions each having a recess 7 inside thereof facing to another recess so as to engage edge of the underwritten band cover member:

Agglutinated on upper surface of the band main member 1 by means of the suitable bonding agent is a band cover member 6 which is formed of suitable material selected from the group consisting of synthetic resin sheet (leather), woven, non-woven or knit cloth, natural or synthetic leather, fur, haired sheet (leather), woolven sheet (leather) or the like and which has a suitable varied design and/or colorful designs on the upper surface thereof. In such a case, each of edges of the said band cover member 6 is closely engaged to said recess 7 of the expanded portion 5, so that the band main member and the band cover member may be much more inseparably adhered with each other, thereby reinforcing the band due to double structure thereof.

It is well known to integrally mold the sandal having a sandal main body and a band main member with the thermoplastic synthetic resin material, but figure of such kind of sandal is poor in its design and colorful design, that is, figure thereof being in simple and monotonous design. In accordance with the present invention, however, the band cover member 6 having a varied design and/or colorful design is attached to upper surface of the band main member, so that the external appearance of the sandal is much more improved with varied design and/or colorful design. Further, the design on upper surface of the band cover member is clearly represented in three dimensions due to the expanded portions 5, thereby increasing value as goods of the sandal.

FIG. 4 shows a modified band of the sandal according to the invention in which the band cover member 6, preferably made of fur, haired sheet (leather) or the like is inseparably mounted on the back surface of the band main member 1 so as to facilitate function for the cooling winter, together with the enhanced comfort.

Figure 6:
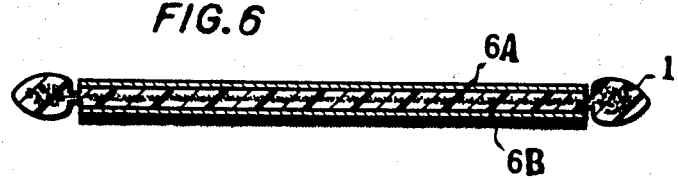
FIG. 6 is an enlarged cross-sectional view of the other embodiment of band of the sandal according to the present invention.

In FIG. 6, there is shown the further modified embodiment in which band cover members are inseparably mounted on both surfaces of the band main member 1 through the bonding agent, the one band cover member 6A mounted on upper surface of the band main member being born with suitable design or colorful design rich of variety and another band cover member 6B mounted on back surface of the band main member being made of fur, haired sheet (leather) or the like material, whereby the sandal having such kind of band cover member facilitates function for the cooling winter, together with that of colorful design rich of variety.

Figure 7:
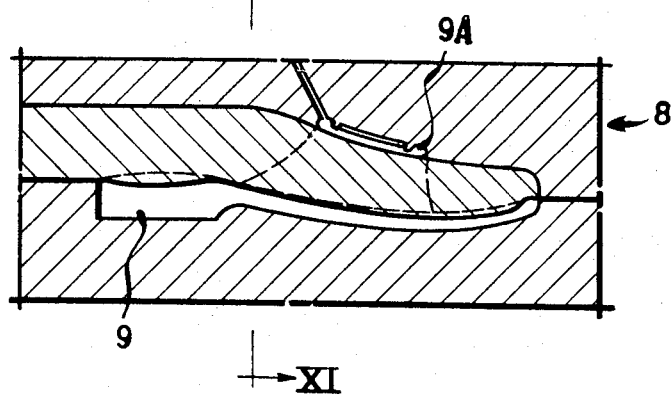
FIG. 7 is a sectional view of a mold available for producing the sandal having the band as shown in FIG. 5.
Figure 8:
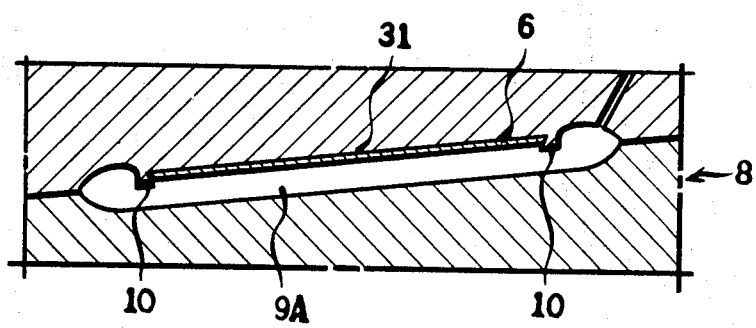
FIG. 8 is an enlarged cross-sectional view in part of said mold as shown in FIG. 7.
Figure 9:
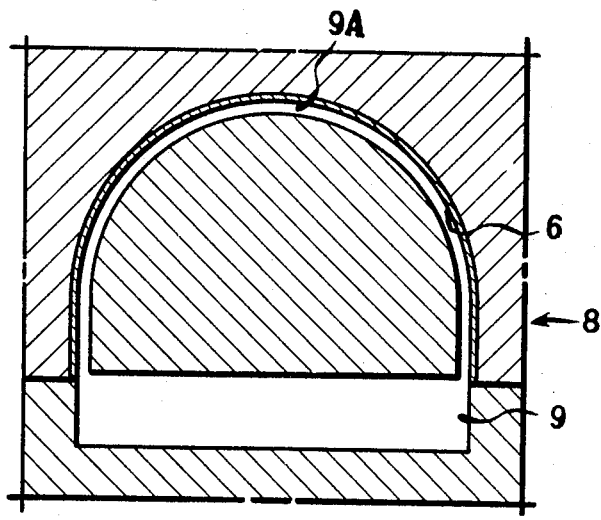
FIG. 9 is an enlarged cross-sectional view of the mold taken along the line IX—IX in FIG. 7.

In the aforesaid embodiments of the band as shown in the above, each of the band cover members is inseparably adhered to the band main member through the bonding agent, while in another case is applicable to the present invention the other embodiment in which the band cover member is inseparably adhered to the band main member to be integrally and simultaneously molded in a split mold together with the sandal main body, as shown in FIGS. 7 to 9.

As shown in FIGS. 7 to 9, the split mold 8 comprises a molding chamber (cavity) 9 having a profile in conformity with outer figure of the sandal to be molded, said chamber 9 of which an upper wall 31 of a space 9A adapted for producing said band main member 6 being provided with a pair of protrusions 10 spaced apart from each other adapted for supporting said band cover member 6 therewith. As clearly shown in FIG. 8, each of said protrusions is slightly inclined toward the center point defined between the protrusions, whereby the band cover member 6 may be easily and precisely mounted on the desired position defined by the protrusions, further upper surface of the band cover member 6 may be substantially protected from saturation of the molten synthetic resin material for forming the sandal consisting of sandal main body and band main member thereto due to said protrusions when the molten synthetic resin material is injected into the molding chamber 9.

Figure 5:
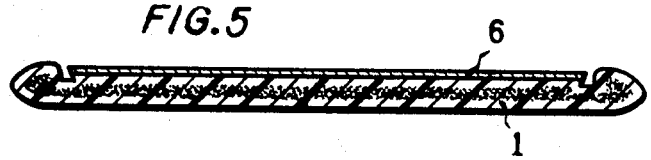
FIG. 5 is an enlarged cross-sectional view of another embodiment of band of the said sandal according to the present invention.

FIG. 5 shows a band of the sandal molded by means of this mold.

Figure 10:
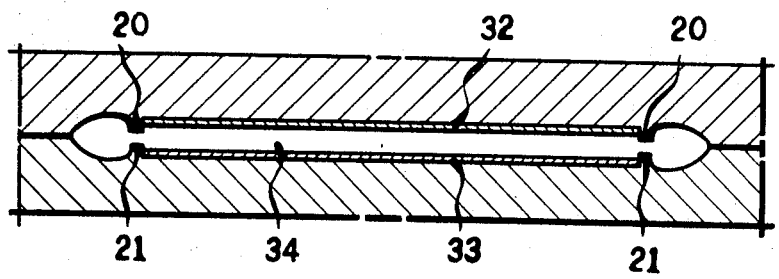
FIG. 10 is a sectional view in part of a mold available for producing the sandal having the band as shown in FIG. 6.

In the modification of the mold illustrated in FIG. 10, a part of enlarged sectional view of a mold available for producing the sandal as shown in FIG. 6 shows in which a pair of protrusions 20, 20, 21 and 21 in duplicate are projected from an upper wall 32 and an under wall 33 into the space 34.

Figure 11:
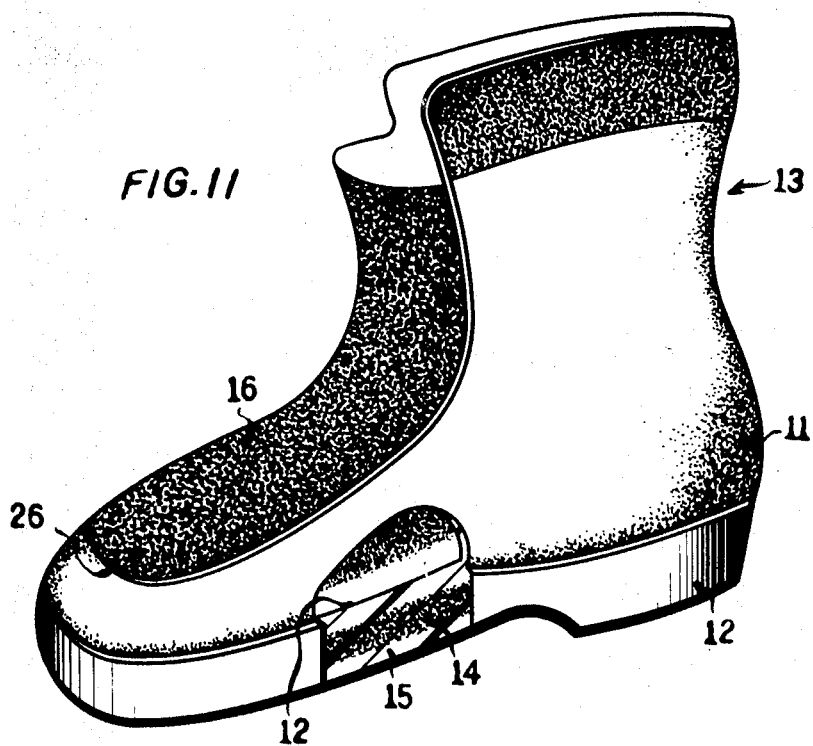
FIG. 11 is a perspective view, partially in section, of modified embodiment, e.g. a shoe, according to the present invention.

Further, the present invention is applied to a sole, and especially a shoe or boot as shown in FIG. 11. Said shoe 13 consisting of a main cover (upper member) 11 for covering the foot of the wearer and a main body (sole member) 12 which are, by means of the same method as applied to the above-mentioned sandal, molded as an integral unit from a uniquely-formed synthetic resin material. Each of the upper member and the sole member include a foamy interior portion 14 and a non-foamy outer layer 15. The foamy interior of the sole extends continuously into the interior of upper member, and the non-foamed outer portions of the sole and upper are formed integrally with the foamy interiors. Said main body (sole) 12 has a unique upper surface 12A of which profile is formed in conformity with shape of the user's sole. If desired, the surface 12A can have the same shape the upper surface 2B previously described with respect to the sandal. In said manner, this embodiment also provides resiliency and comfort together with durability similar to the effect and advantages of the aforesaid sandal.

In the particular embodiment illustrated a cover member 16 is mounted on the upper front portion of the upper member 11. The cover member 16 is made of suitable material selected from the group consisting of synthetic resin, woven or knit cloth, natural or synthetic leather, fur, haired sheet (leather) and the like and which is separately formed from said shoe main cover 11 and the sole 12, said cover member 16 having a suitable varied design or colorful design on the upper surface thereof, whereby the shoe (boot) can bear the colorful design rich of variety. Around the cover member 16 an expanded portion 26 is formed on upper front surface of the shoe upper 11, whereby the colorful design represented on the upper surface of the cover member 16 is represented in three dimensions due to the expanded portions, thus value of the shoe as goods may extremely be increased.

Figure 12:
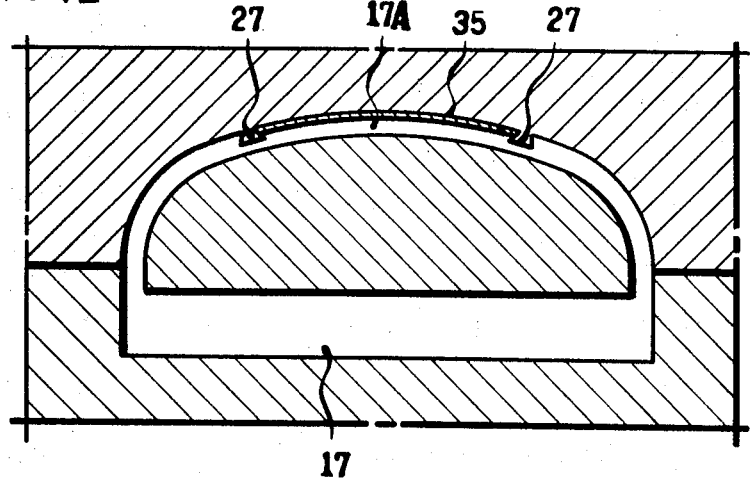
FIG. 12 is a diagrammatic cross-sectional view of a mold available for producing the embodiment as shown in FIG. 11.

FIG. 12 shows diametrically a part of a mold available for producing said boot, according to this embodiment, a pair of protrusions 27 is downwardly projected from upper wall 35 of a boot cover-molding space 17A of a molding chamber 17, said protrusions each being slightly inclined toward the center point defined between the protrusions. In said manner, the cover member 16 may be easily and precisely mounted on the desired position defined by the protrusions, since said protrusions protect said cover member from dropping into the space 17A.

Another embodiment of the invention is shown in FIG.

13. In this embodiment a sandal B provides the same structure and function with those of the sandal as illustrated in FIGS. 1 and 5, while the sandal main body member 18 thereof is somewhat different as follows:

To the upper surface of the sandal body member 18 a sandal cover member 19 is inseparably adhered by means of the same way applied to the band cover member as shown in FIG. 5. Said sandal cover member 19 is formed of the suitable material selected from the group consisting of synthetic resin sheet, woven, non-woven or knit cloth, natural or synthetic leather, fur, woolven sheet (leather), haired sheet (leather) and the like and is separately formed from the sandal cover member. In said manner, should the sandal cover member 19 be formed of fur, woolven sheet, haired sheet or the like material, the sandal may be performed their functions efficiently for the cooling winter. In addition, the sandal cover member 19 of this embodiment is extremely reinforced due to the sandal cover member 19, and its durability and comfort being much more improved.

Figure 14:
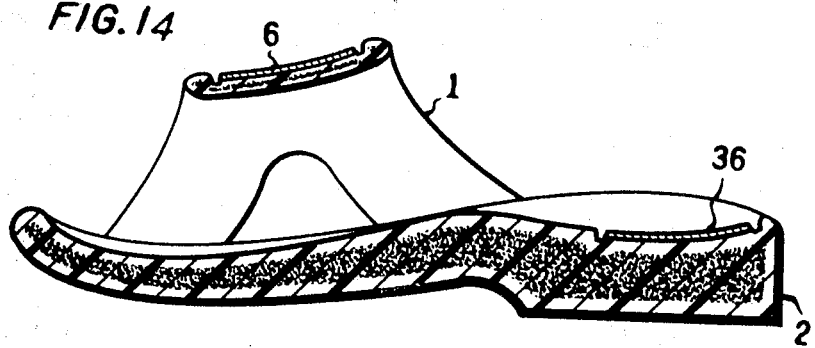
FIG. 14 is a longitudinal sectional view showing another embodiment of the sandal according to the present invention.

FIG. 14 shows another embodiment of the sandal according to the invention. In this embodiment, a mark (brand) plate 36 made of suitable material such as synthetic resin, woven knit cloth, natural or synthetic leather or the like is inseparably adhered to the rear upper surface of a sandal body member 20 of the sandal of which construction and function are similar to the aforesaid sandals as shown in FIGS. 1 and 5.

Figure 13:
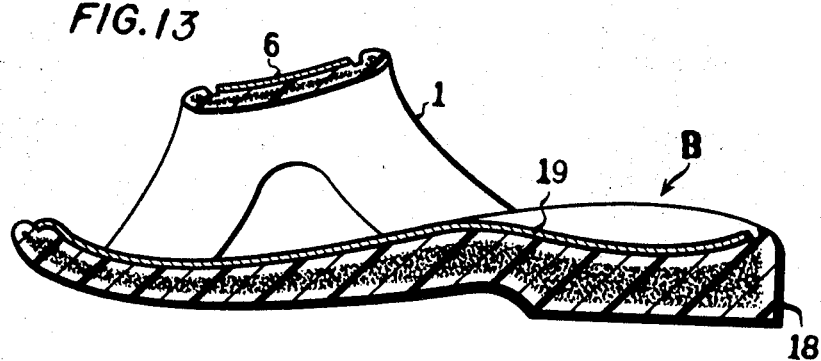
FIG. 13 is a longitudinal sectional view showing the other embodiment of the sandal according to the present invention.
Figure 15:
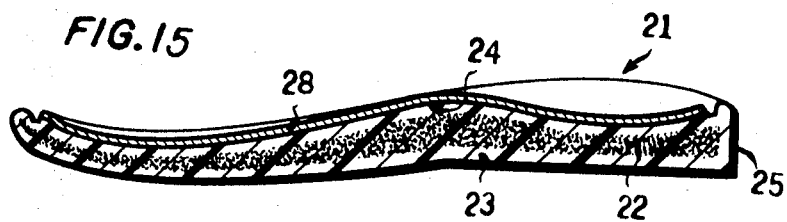
FIG. 15 is a longitudinal sectional view of other embodiment according to the present invention.

Further, the present invention is applied to an upper sole as shown in FIG. 15. A body member 25 of the upper sole 21 also comprises a foamy interior portion 22 adapted for effecting resiliency, a non-foamy integral outer layer 23 for providing durability and resistance against deformation and a unique upper surface 24 which bears the profile in conformity with shape of user's sole. To the upper surface 24A of said body member 25 of cover member 28 is adhered by means of the same method applied to the cover 19 as shown in FIG. 13. Thus, the upper sole 21 also can effect the same advantages with those of sandals as shown in the aforesaid embodiments. Should said upper sole 21 be applied to upper surface of the sole in the conventional type sandal, such kind of conventional sandal will be undoubtedly improved in its resiliency, reinforcement and comfort to use thereof.

As hereinabove mentioned, the method of manufacturing the synthetic resin material featured in the present invention is not only of critical importance, but is a highly complex and specialized process, as will now be described.

A number of various thermoplastic resinous materials which can be expanded or foamed may be used to form the novel foamed material utilized in the present invention. However and without intending to be restricted thereto, the invention is particularly adapted to be formed of granules or beads of polystyrene. Said polystyrene particles may be in an essentially linear or in a cross-linked form, as being generally representative of expandable thermoplastic resinous materials and as being especially representative of alkenyl aromatic compounds which contain at least one alkenyl aromatic compound having the general formula $Ar-CR=CH_2$ wherein Ar is an aromatic compound and R is selected from the group consisting of a hydrogen atom and a methyl radical. Expandable thermoplastic copolymers of styrene and polymers and copolymers of a-methyl styrene, ar-methyl styrene or vinyltoluene, mono- and di-chlorostyrene, including copolymers containing small amounts of such materials as divinylbenzene may frequently be utilized with benefits commensurate with those which are derivable from employment of polystyrene. Often this may also be the case with other expandable thermoplastic resinous materials including various copolymers of vinylidene chloride which are frequently generically described as being sarans and thermoplastic resinous materials which may be comprised of polymers and copolymers of methyl methacrylate, ethyl acrylate and other derivatives of acrylic acid such as their homopolymers and copolymers of methyl methacrylate and vinylidene chloride; polymers and copolymers of vinyl acetate and vinyl butyral and the like; and various thermoplastic or thermoplastified derivatives of cellulose including cellulose nitrate and cellulose acetate. Cross-linked materials usually have greater thermal stability and frequently tend to produce stronger, less heat-sensitive foam structures.

The blowing agents employed for the expandable thermoplastic resinous material may be those which are commonly utilized including dichlorodifluoromethane, carbon dioxide, pentane and other low boiling hydrocarbons or other suitable materials such as heat sensitive gas generating agents and the like. Conventional amounts of the blowing agent may be incorporated in the discrete particles of thermoplastic resinous material to render it suitably expandable. Thus, an incorporated amount of dichlorodifluoromethane between about 5 and 15 percent by weight may be found to be a satisfactory and efficient amount in many expandable thermoplastic resinous materials, particularly polystyrene and many other alkenyl aromatic thermoplastic resinous materials.

To form the foamed material, the preferred method comprises charging a mass of said granules into the dischargeable injection chamber of an injection molding apparatus; then, in intermittent molding cycles, forcing said mass under pressure sequentially in and through a first cold zone in said chamber wherein a portion of said mass is compacted in solid granular form while being maintained at a temperature beneath its foaming temperature; a second heated zone adjacent to the first zone in said chamber wherein a portion of said mass is heated to a flowable condition under the application of an adequate quantity of heat to cause it to attain a foaming temperature; the solid compacted portion of the mass in the first zone continuously maintaining the heated portion of said mass in the second zone to restrain substantial foaming therein throughout said intermittent cycles; and a discharge zone in said chamber from which a portion of said heated mass is injected to fill a retractable mold form having an enlargeable cavity wherein the injected mass is initially exteriorly cooled against the mold form to form a solidified surface layer while being maintained under pressure; and finally relieving the pressure and enlarging the mold form to permit the central, relatively uncooled heated mass to expand and force the solidified surface layer against the enlarged confining limits of the mold form to form said sandwich construction molded foam structure.

While the present invention has been illustrated and described herein with respect to a preferred embodiment, it is not desired to limit the invention only to the embodiment, but the invention should be considered to include all the substitutes, modifications and equivalents which are encompassed within the essential part of the invention to be set forth in the scope of the underwritten claims and within the scope of the spirit exhibited in the intention of the inventor.

For example, said sandals and the boots may be molded with non-foamy synthetic resin material and also the upper surface of the sandal body member or the sole of the boot may be provided with a flat surface.

What I claim is:

1. An article of footwear comprising a sole and an upper for completely covering the foot of the wearer, the sole and the upper being integrally molded from synthetic thermoplastic resin material, each of the sole and upper having a foamed interior portion whereby a highly resilient and pliable cushion is provided and a non-foamed outer portion integral with an surrounding said foamed portion to provide resistance against deformation of the footwear by the weight of the wearer thereof.

2. The structure of claim 1 in which the sole includes front and rear ends and upper and lower surfaces and is provided with a generally concave recess in the front portion of the upper surface and a generally concave recess in the rear portion of the upper surface for receiving, respectively, the ball and heel of the foot of the wearer, the recesses being joined by a raised central portion for supporting the arch of the foot of the wearer, the sole having raised ridge portions around the periphery thereof adjacent to each of the recesses.

3. The structure of claim 1 including a cover member, the upper having an expanded portion on the upper surface thereof extending adjacent opposite sides of the upper, each of the expanded portions having a recess facing the recess of the other expanded portion, the cover member being mounted on the upper and received by the recesses.

4. The structure of claim 3 in which the cover member is formed of material selected from the group consisting of synthetic resin sheet, cloth, leather, fur, haired sheet, and woolen sheet.

References Cited

UNITED STATES PATENTS

| | | | |
|---|---|---|---|
| 2,374,487 | 4/1945 | Jayne | 36—32 |
| 2,760,279 | 8/1956 | Jones et al. | 36—11.5 |
| 2,971,278 | 2/1961 | Scholl | 36—11.5 X |

PATRICK D. LAWSON, Primary Examiner

U.S. Cl.. X.R.

36—4